3,506,759
WOOD PROTECTION PROCESS
Jacques L. Ricard and Walter B. Bollen, Corvallis, Oreg., assignors, by mesne assignments, to Research Corporation, New York, N.Y., a nonprofit corporation of New York
No Drawing. Filed Jan. 9, 1967, Ser. No. 607,891
Int. Cl. A01n 15/00
U.S. Cl. 424—93      1 Claim

ABSTRACT OF THE DISCLOSURE

A method for the protection of Douglas fir heartwood against fungus-induced deterioration wherein the heartwood is inoculated with a commensal fungus antagonistic to deterioration-causing fungi. A fungus-elaborated antibiotic and a method for its production.

---

Douglas fir utility poles are used extensively throughout the Pacific Northwest, particularly in the transmission and distribution of electric power, since the wood has good mechanical strength and resistance to rot and decay. These desirable properties are attributed to the high lignin and cellulose content of the tracheid walls of the wood.

Douglas fir poles are treated with preservatives prior to being placed into service in order to further increase their resistance to decay. Even so, the poles decay in time and a considerable expenditure of manpower and money is involved in the detection and replacement of unsound poles. Under ordinary conditions, the useful life span of a preservative-treated pole is expected to approach fifty years.

Internal or heartwood deterioration caused by infection with various fungi such as those of the genus Poria, and more particularly P. carbonica, is often responsible for a drastic shortening of a pole's expected term of useful service. The presence of the infecting organism is established by culturing a wood core sample bored from the infected pole on a suitable growth medium such as malt agar. The infection, being internal, cannot be detected in its earlier stages by visual inspection of the pole's exterior and is not amenable to conventional methods of decay control.

We have discovered a new approach to the protection of Douglas fir wood from the heartwood deterioration caused by P. carbonica and related organisms. According to our novel method, Douglas fir trees or poles are inoculated with a microorganism antagonistic to P. carbonica and related organisms but which is not harmful to the wood.

It is, therefore, a principal object of the present invention to provide a method for the protection of Douglas fir wood from fungus-caused heartwood deterioration.

It is a further object of the invention to provide a biological control method for the protection of Douglas fir wood.

Biological control involves a situation wherein the activity or degree of survival of a pathogen, and hence the concomitant disease, is reduced by means of another living organism. Biological control is generally more difficult to achieve than chemical control since it requires a more detailed knowledge of the ecological situation. However, when compared to chemical control, it has several distinct advantages such as the absence of undesirable chemical residues, a greater flexibility in coping with genetic changes in the pathogen to be controlled, and in certain systems, an overall lower cost of application.

Biological control is brought about here by the introduction of a species of controlling microorganism antagonistic to P. carbonica and related organism. A novel aspect of our method is that the controlling organism, a live commensal, is inoculated directly into the substrate to be protected rather than merely applied to the external environment.

More specifically, our invention is a method for controlling the fungus-induced deterioration of Douglas fir heartwood which comprises inoculating the heartwood to be protected with a viable fungus herein designated FY. A culture of this FY organism as been deposited in the American Type Culture Collection and has received ATCC accession No. 16,675.

FY organism was detected and isolated using routine wood core sample procedures on malt agar containing 25 grams of malt extract and 16 grams of agar in one liter of distilled water (Alexopoulos' formula). The organism will also grow on Czapek agar and other related media, and on Douglas fir or birch sticks or meal particularly if enriched with a malt extract broth. Optimum growth is obtained at about 20° C. and 30% moisture content based on the weight of the dry wood.

The organism on culture exhibits a moderate rate of growth and has a soft, whitish-grey, partially embedded mycelium. Its most obvious characteristic is the bright yellow, water-soluble pigment, apparently synthesized by endoenzymes, which diffuses throughout the agar plate well ahead of the spreading mycelium. All of the strains of FY organism as first isolated were found to produce the yellow pigment but the pigment producing ability is frequently lost after maintenance on artificial media for several weeks. Pigment synthesis was resumed whenever the culture was returned to a competitive situation, i.e., by planned or accidental inoculation with other fungi or bacteria.

At about two weeks of age the color of the colony starts to change from grey to black, and after about a month the entire colony becomes black. The black coloration appears to coincide with the formation of conidia in chains at the tip of hyphae in the aerial mycelia. At $100 \times$ magnification, the hyphae appear greyish, abundantly branched and about two to four microns in diameter. The hyphae bear oval to round spores about 4.5–7 microns in diameter and light brown to black in color. The branching hyphae form various patterns ranging from simple curling to complete rings or even ball-like bodies. The FY organism appears to be a fungus of the class Deuteromycetes and the order Moniliales.

Unlike Poria organisms, FY fungus grows through live or cut Douglas fir tree wood without damage to the wood structure. The hyphae of Poria organisms penetrate the tracheid walls, presumably by enzymatic action or lysis, producing bore holes. The nutritional needs of FY are met by the hemicellulose components distributed throughout the wood rather than the cellulose or lignin of the tracheid wall. As shown by tests in the field and in the laboratory, FY does not induce lysis of the tracheid wall or adversely affect the mechanical strength of the wood.

Since FY is a facultative anaerobe and poor gas former, the usual Warbug respirometer studies were ineffective. A simple culture technique was employed wherein FY was inoculated in 2.5% malt extract broth as a positive control and in dilute malt extract broth as a negative control. The test groups were flasks containing a medium similar to the negative control, thereby allowing inducible enzyme synthesis, but enriched with 2% of the carbon compound to be tested as an energy source. After about one month of incubation at room temperature, the resultant mycelia were collected by filtration, dried and weighed. The results obtained are tabulated below as weight in milligrams of hyphae obtained per gram of carbon compound.

| Medium: | Wt. of Hyphae |
|---|---|
| 2.5% malt extract | 64.5 |
| 0.125% malt extract | 5.0 |
| 0.125% malt extract and 2% xylose | 12.5 |
| 0.125% malt extract and 2% arabinose | 7.1 |
| 0.125% malt extract and 2% glucose | 11.9 |
| 0.125% malt extract and 2% galacturonic acid | 12.5 |
| 0.125% malt extract and 2% coniferyl alcohol | 15.2 |
| 0.125% malt extract and 2% coumaryl alcohol | 6.9 |
| 0.125% malt extract and 2% maltose | 12.8 |
| 0.125% malt extract and 2% cellobiose | 9.0 |
| 0.125% malt extract and 2% lignin (water-dioxane) | 83.5 |
| 0.125% malt extract and 2% polygalacturonic acid | 10.0 |
| 0.125% malt extract and 2% mixture of compounds above | 6.3 |
| 0.125% malt extract and 2% xylan | 266.0 |

It is apparent from these results that xylan is a preferred carbon source. This material is a component of the hemicellulose fraction of wood not particularly critical for its mechanical strength.

The residual malt extract obtained after separation of the hyphae was found to contain an antibiotic apparently excreted by FY mycelium. The extract, after steam drying, was tested by the well known Oxford cup method and exhibited typical antibiotic activity against *Corynebaterium diphtheriae* and *Neisseria catarrhalis*. While the FY-elaborated antibiotic has not yet been completely characterized, it does not appear to resemble any of the presently known antibiotics.

The activity of various known antibiotics against *P. carbonica* was assayed. None of the antibiotics tested had any effect on the growth of *P. carbonica* when discs containing the antibiotics at the concentrations indicated below were applied to a malt extract agar plate inoculated at the center with a *P. carbonica* covered agar block:

Streptomycin—2 mcg.
Chloromycetin—5 mcg.
Kanamycin—5 mcg.
Erythromycin—2 mcg.
Coly-mycin—2 mcg.
Penicillin—2 units
Tetracyline—5 mcg.
Novobiocin—5 mcg.
Neomycin—5 mcg.
Oleandomycin—2 mcg.

The simultaneous inoculation of agar plates with actively growing portions of mycelia of FY and *P. carbonica* invariably resulted in the death of the latter organism. FY was also antagonistic to *P. monticola, P. xantha, Lentinus lepideus, Lenzites trabea* and *Fomes subroseus*. No live *P. carbonica* could be recovered from pole sections permeated with FY as a result of natural or artificial inoculation.

Douglas fir trees or poles were inoculated with FY permeated sticks in the field taking precautions to avoid contamination of the wood by other organisms. In one inoculation procedure, the FY permeated sticks together with nutrient were placed in the holes resulting from the taking of wood core samples. In a more rapid inoculation procedure, the sticks are shot into the wood as a dart or projectile. Such internal inoculation procedures are necessary to start the FY growth in the heartwood where it is antagonistic to the initial or incipient growth of and protective against *P. carbonica* and other deterioration-causing fungi. Merely applying FY-containing material to the exterior of the tree or poles does not afford protection against heartwood deterioration.

Having described our invention, we claim:

1. A method for controlling deterioration of Douglas fir heartwood induced by a fungus selected from the group consisting of *Poria carbonica, Poria monticola, Poria xantha, Lentinus lepideus, Lenzites trabea* and *Fomes subroseus*, which comprises inoculating the heartwood with FY fungus, ATCC No. 16,675, in an amount effective to control the deterioration.

References Cited
UNITED STATES PATENTS 3,337,395   8/1967   Page _____ 424—93

ALBERT T. MEYERS, Primary Examiner

J. D. GOLDBERG, Assistant Examiner